United States Patent
Havlir et al.

(10) Patent No.: US 9,330,432 B2
(45) Date of Patent: May 3, 2016

(54) QUEUING SYSTEM FOR REGISTER FILE ACCESS

(71) Applicant: Apple Inc., Cupertino, CA (US)

(72) Inventors: Andrew M. Havlir, Austin, TX (US); Sreevathsa Ramachandra, Austin, TX (US); William V. Miller, Austin, TX (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 13/970,578

(22) Filed: Aug. 19, 2013

(65) Prior Publication Data

US 2015/0049106 A1   Feb. 19, 2015

(51) Int. Cl.
  *G06F 12/00* (2006.01)
  *G06F 13/00* (2006.01)
  *G06F 13/28* (2006.01)
  *G06T 1/20* (2006.01)

(52) U.S. Cl.
  CPC ..................... *G06T 1/20* (2013.01)

(58) Field of Classification Search
  CPC .......................................... G06T 1/60
  USPC ....................................... 711/122
  See application file for complete search history.

(56) References Cited

U.S. PATENT DOCUMENTS

| | | | | |
|---|---|---|---|---|
| 6,061,749 A | * | 5/2000 | Webb et al. ............. | 710/65 |
| 6,289,433 B1 | * | 9/2001 | Garg et al. .............. | 712/23 |
| 6,324,594 B1 | * | 11/2001 | Ellis .................. | G06F 13/28 |
| | | | | 710/24 |
| 7,647,475 B2 | * | 1/2010 | Svendsen ............. | G06F 9/3017 |
| | | | | 712/218 |
| 7,788,470 B1 | | 8/2010 | Purcell et al. | |
| 2005/0038976 A1 | * | 2/2005 | Miller ................ | 712/207 |
| 2006/0095728 A1 | * | 5/2006 | Hammond et al. ..... | 712/214 |
| 2006/0271820 A1 | * | 11/2006 | Mack et al. .......... | 714/17 |
| 2007/0204137 A1 | * | 8/2007 | Tran ................. | 712/214 |
| 2008/0121687 A1 | * | 5/2008 | Buhot ................ | 235/375 |
| 2008/0244242 A1 | * | 10/2008 | Abernathy et al. ..... | 712/225 |
| 2008/0250422 A1 | * | 10/2008 | Lewis ................ | 718/107 |
| 2009/0044189 A1 | * | 2/2009 | Mutlu et al. .......... | 718/102 |
| 2010/0268882 A1 | | 10/2010 | Cargnoni et al. | |
| 2011/0063313 A1 | * | 3/2011 | Bolz et al. ............ | 345/531 |
| 2011/0109638 A1 | * | 5/2011 | Duluk, Jr. ............ | G06T 1/20 |
| | | | | 345/522 |
| 2011/0131375 A1 | * | 6/2011 | Noeldner ............. | G06F 12/00 |
| | | | | 711/114 |
| 2011/0131385 A1 | * | 6/2011 | Henriksson et al. ..... | 711/158 |
| 2011/0320523 A1 | | 12/2011 | Chan et al. | |

* cited by examiner

*Primary Examiner* — Sheng-Jen Tsai
(74) *Attorney, Agent, or Firm* — Meyertons, Hood, Kivlin, Kowert & Goetzel, P.C.

(57) ABSTRACT

Techniques are disclosed relating to arbitration of requests to access a register file. In one embodiment, an apparatus includes a write queue and a register file that includes multiple entries. In one embodiment, the apparatus is configured to select a request from a plurality of requests based on a plurality of request characteristics, and write data from the accepted request into a write queue. In one embodiment, the request characteristics include: whether a request is a last request from an agent for a given register file entry and whether the request finishes a previous request. In one embodiment, a final arbiter is configured to select among requests from the write queue, a read queue, and multiple execution pipelines to access banks of the register file in a given cycle.

22 Claims, 9 Drawing Sheets

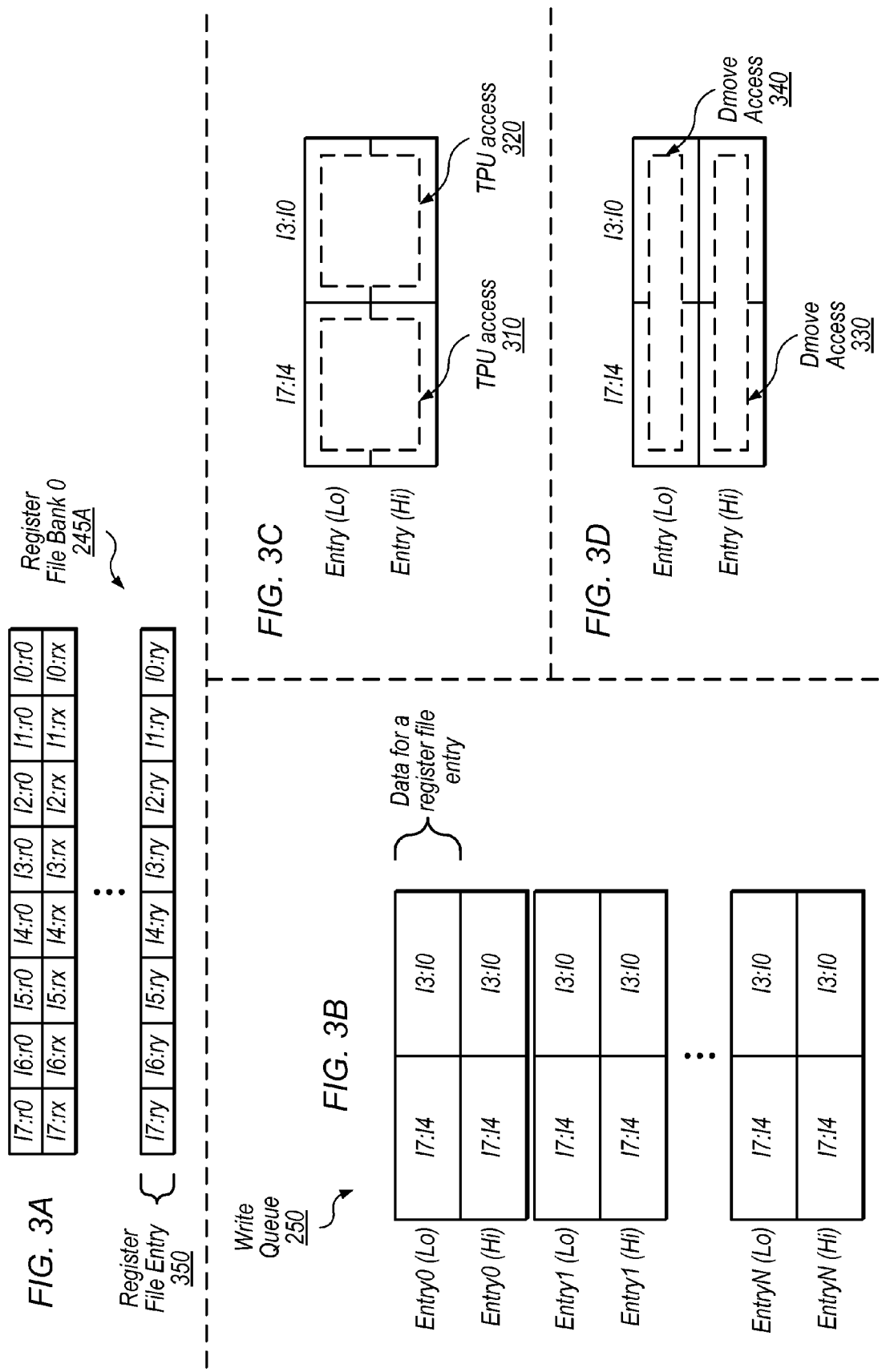

Write Request Classifications 402:

1) NON-LAST: agent wants to write to a given entry, but this request is not the last request by the agent for the given entry.

2) FINISHING: agent is finishing a previous (NON-LAST) request, and this request is the last request by the agent for a given entry.

3) LAST NON-FINISHING: agent is sending a new request that does not finish a previous request, and this request is the last request by the agent for a given entry.

Table 410

| | Request Type | | |
|---|---|---|---|
| | Finishing | Last-NF | Non-Last |
| Write Requestor R0 | P1 | P4 | P5 |
| Write Requestor R1 | P2 | P6 | P8 |
| Write Requestor R2 | P3 | P7 | P9 |

→ Priority State 412

Table 420

| | Request Type | | |
|---|---|---|---|
| | Finishing | Last-NF | Non-Last |
| Write Requestor R0 | P1 | P7 | P9 |
| Write Requestor R1 | P2 | P4 | P5 |
| Write Requestor R2 | P3 | P6 | P8 |

→ Priority State 412

Table 430

| | Request Type | | |
|---|---|---|---|
| | Finishing | Last-NF | Non-Last |
| Write Requestor R0 | P1 | P6 | P8 |
| Write Requestor R1 | P2 | P7 | P9 |
| Write Requestor R2 | P3 | P4 | P5 |

→ Priority State 412

FIG. 4A

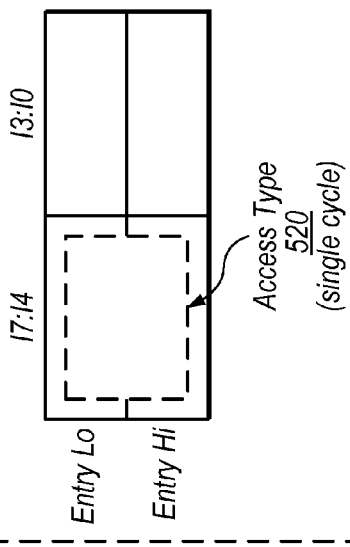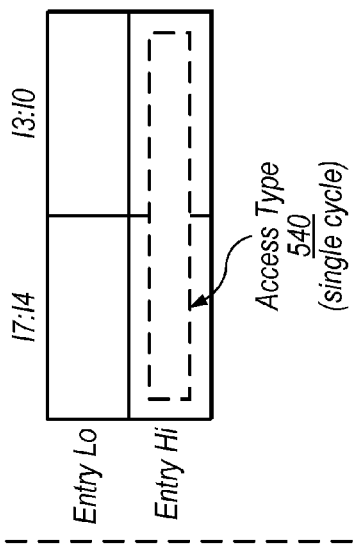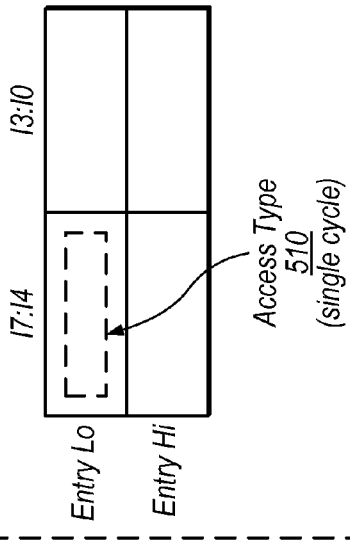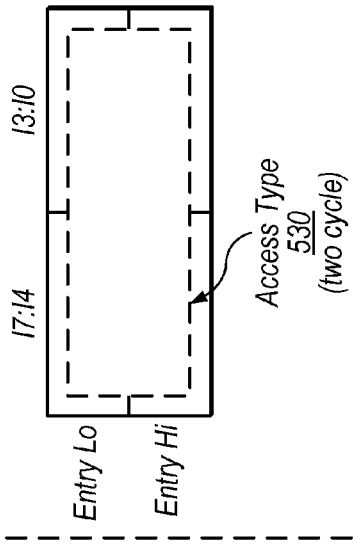

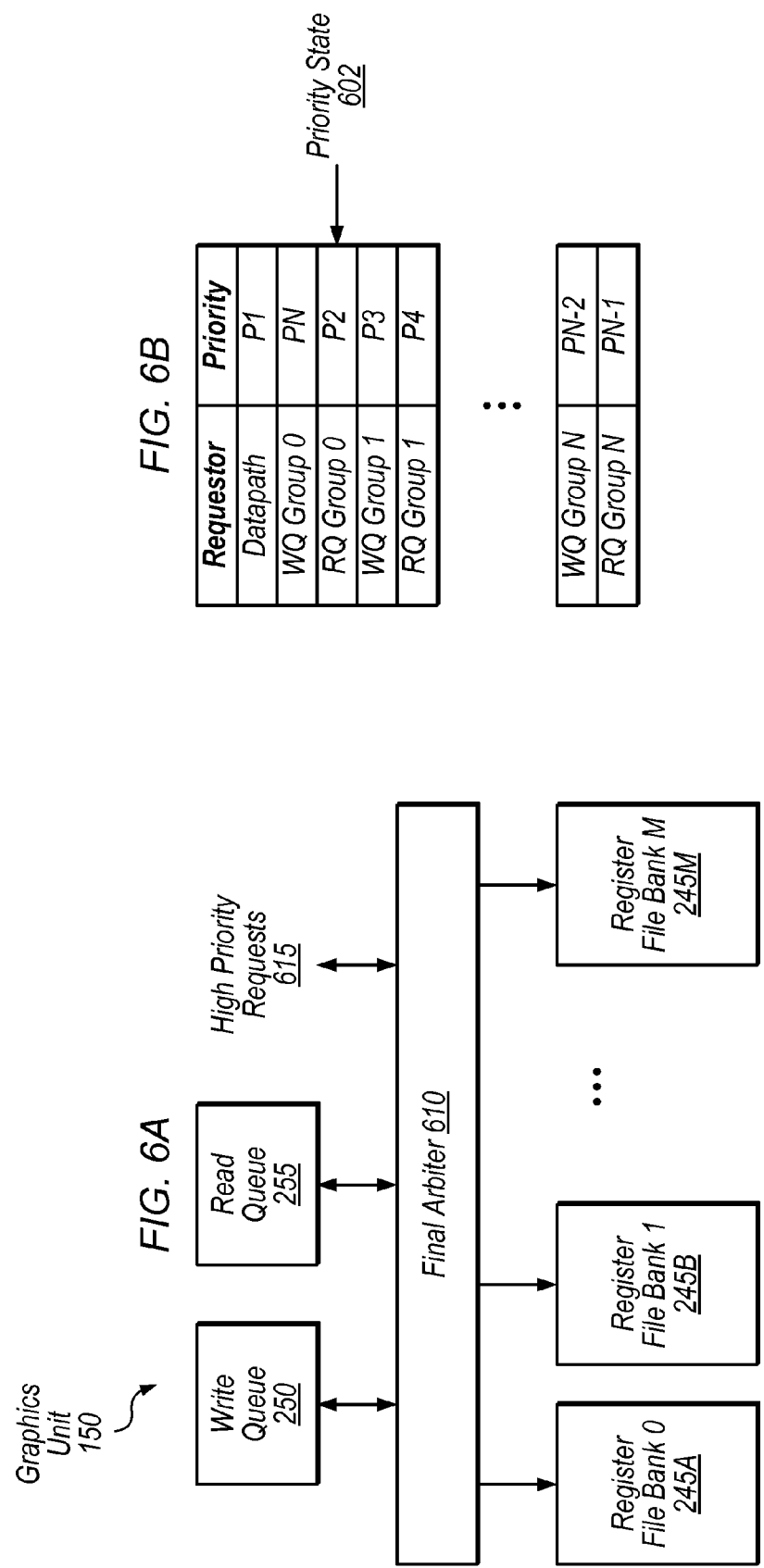

QUEUING SYSTEM FOR REGISTER FILE ACCESS

BACKGROUND

1. Technical Field

This disclosure relates generally to computer processing, and more specifically to arbitration involved in accessing a register file.

2. Description of the Related Art

Register files for graphics processing units (GPUs) are typically large to support the data and task level parallelism required for graphics processing. Register files typically store operand data for provision to one or more execution units. Register files are often implemented using random access memory (RAM), which may consume a significant amount of energy. In some implementations, different agents may access a register file differently. This may waste power in accessing the register file if agents are not accommodated in accessing the register file using a desired format. As one example of different agents, a memory controller may be configured to load data into a register file, while execution pipelines may be configured to read operands from the register file and write results to the register file.

SUMMARY

Techniques are disclosed relating to arbitration of requests to access a register file. In one embodiment, an apparatus includes a write queue and a register file that includes multiple entries. In one embodiment, the apparatus is configured to select a request from a plurality of agent requests based on a plurality of request characteristics, and write data from the accepted agent request into a write queue. In one embodiment, the request characteristics include: whether a request is a last request from an agent for a given register file entry and whether the request completes a previous request. In some embodiments, the apparatus is configured to classify requests as non-last, last non-finishing, or finishing. In one embodiment, an arbiter for the write queue is configured to give highest priority to finishing requests, middle priority to last non-finishing requests, and lowest priority to non-last requests. In some embodiments, a priority scheme may ensure a certain level of fairness among requesting agents. In some embodiments, classification and prioritization of requests to the write queue may allow implementation of a smaller write queue and/or reduced power consumption in accessing a register file.

In one embodiment, a final arbiter is configured to select among requests from the write queue, a read queue, and multiple execution pipelines to access banks of the register file in a given cycle. In one embodiment, the final arbiter may be configured to give high priority to the execution pipelines, while fitting in requests by the write queue and/or read queue to register file banks that are not accessed by the execution pipelines in a given cycle. In one embodiment, the final arbiter may be configured to guarantee that requests by the write queue and/or read queue are not permanently blocked by cycling a priority state among the read queue and the write queue and among register file banks.

BRIEF DESCRIPTION OF THE DRAWINGS

FIG. 3A is a block diagram illustrating one exemplary embodiment of a register file bank.

FIG. 3B is a block diagram illustrating one exemplary embodiment of a write queue.

FIGS. 3C-3D are block diagrams illustrating exemplary write queue accesses.

FIG. 4A is a diagram illustrating one exemplary embodiment of a write queue priority scheme.

FIG. 5A is a diagram illustrating one exemplary embodiment of a read queue priority scheme.

FIGS. 5B-5E are block diagrams illustrating exemplary read queue accesses.

FIG. 6A is a block diagram illustrating one exemplary embodiment of a graphics unit that includes a final arbiter.

FIG. 6B is a block diagram illustrating one exemplary embodiment of a final arbitration priority scheme.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
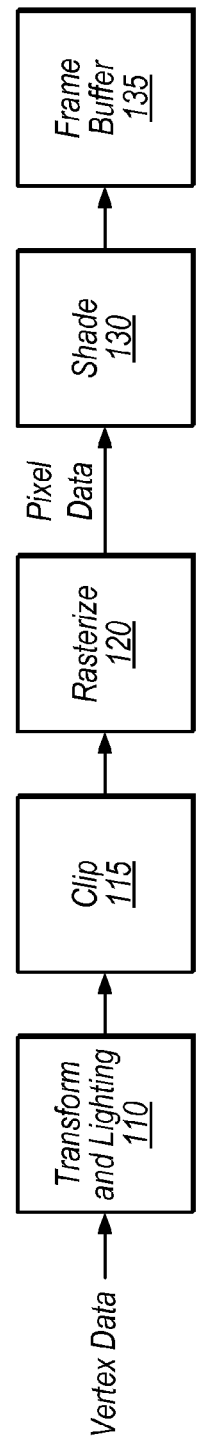
FIG. 1A is a block diagram illustrating a simplified graphics processing flow.
Figure 1B:
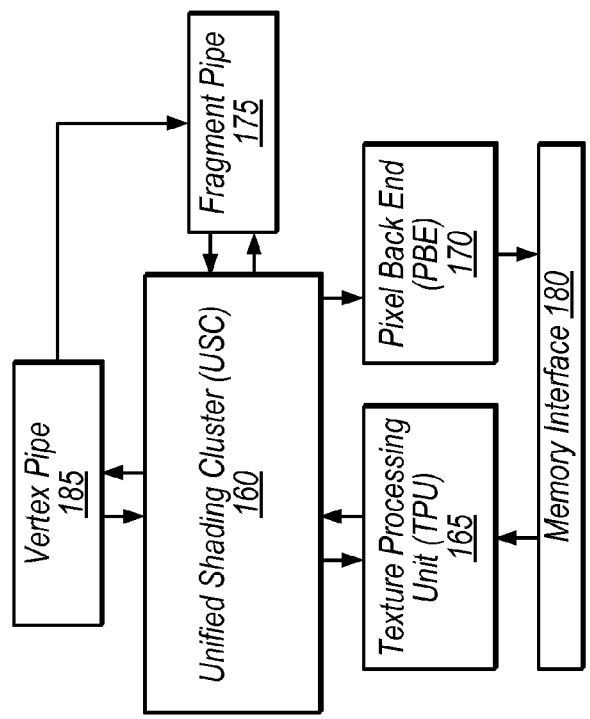
FIG. 1B is a block diagram illustrating one embodiment of a graphics unit.
Figure 2:
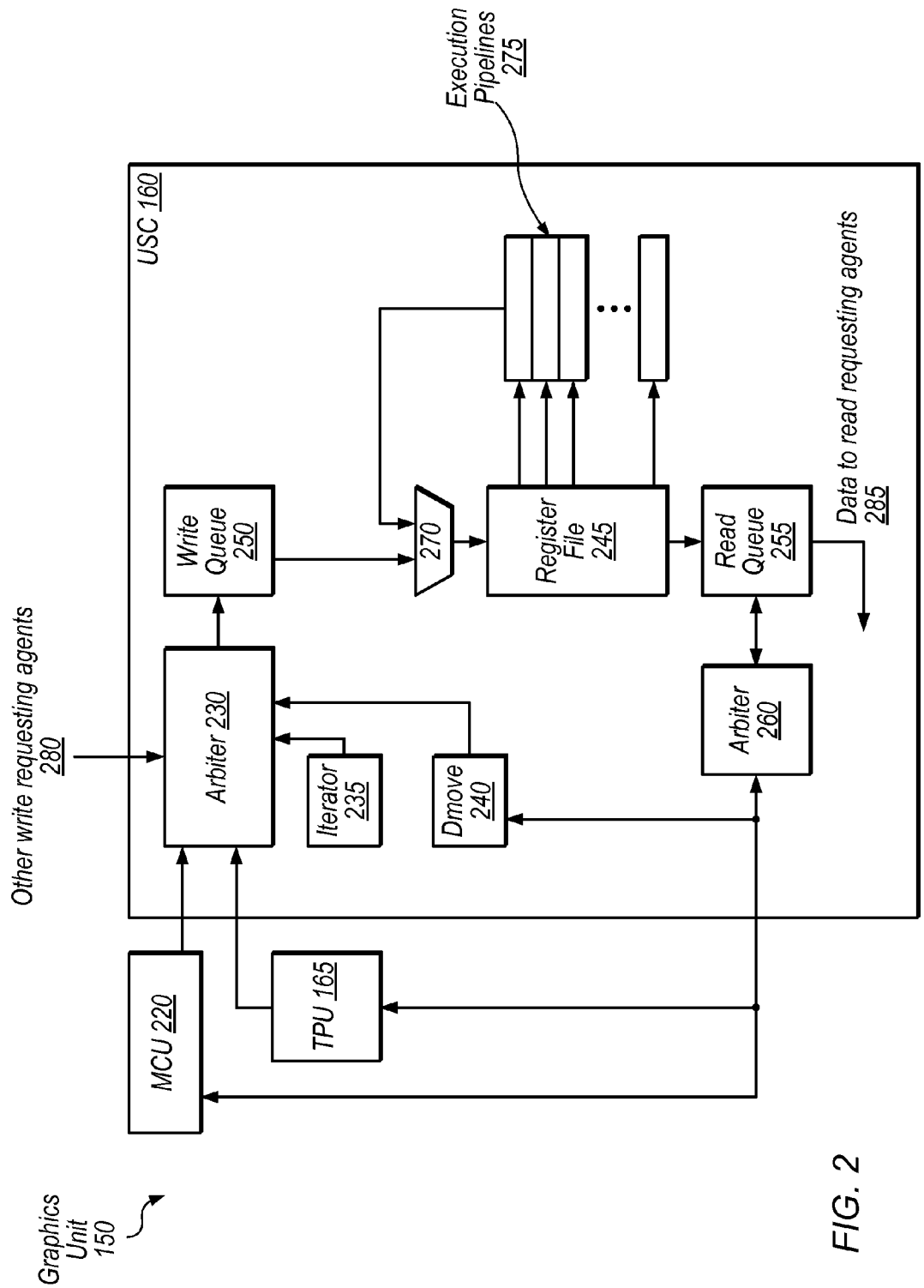
FIG. 2 is a block diagram illustrating one exemplary embodiment of a graphics unit with multiple agents.

This disclosure initially describes, with reference to FIGS. 1-2, an overview of a graphics processing flow and an exemplary graphics unit. It then describes an exemplary register file, write queue, and read queue with reference to FIGS. 3-5 and 7. FIGS. 6A-6B illustrate one embodiment of a graphics unit that includes a final arbiter and FIG. 8 illustrates an exemplary device that includes a graphics unit. In some embodiments, a graphics unit as described herein may reduce power consumption involved in queuing data for a register file and/or accessing the register file.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160. TPU 165 may be described as a sample return unit for USC 160 in some embodiments.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Referring now to FIG. 2, a block diagram illustrating a more detailed exemplary embodiment of graphics unit 150 is shown. In the illustrated embodiment, graphics unit 150 includes USC 160, TPU 165, and MCU 220. In the illustrated embodiment, USC 160 includes iterator 235, dmove unit 240, arbiter 230, write queue 250, MUX 270, register file 245, execution pipelines 275, read queue 255, and arbiter 260.

In one embodiment, arbiter 230 is configured to select an agent from among TPU 165, MCU 220, iterator 235, and dmove unit 240 to write to write queue 250 in a given cycle. Similarly, in one embodiment, arbiter 260 is configured to select an agent from among TPU 165, MCU 220, and dmove unit 240 to read data from register file 245 into read queue 255 in a given cycle and provide the data to read requesting agents (as shown by signal 285). In another embodiment, USC 160 is configured to stream data directly from register file 245 to requesting agents, and may not include a read queue. In still other embodiments, one or more of TPU 165, MCU 220, and dmove unit 240 may not be configured to read data from register file 245 but may only be configured to write data to register file 245. USC 160 may also include a final arbiter to select between requests from execution pipelines 275, write queue 250, and/or read queue 255 to access particular banks of register file 245 (a final arbiter is not shown in FIG. 2, but is discussed in further detail below with reference to FIG. 6A). In one embodiment, arbiter 230 is included in write queue 250 and arbiter 260 is included in read queue 255. In other embodiments, arbiter 230 and/or arbiter 260 may be included in a control unit of USC 160 or elsewhere, as desired.

In one embodiment, write queue 250 is configured to write more data to register file 245 in a given cycle than can be written to write queue 250 in a given cycle. In one embodiment this is the case because write bandwidth to write queue 250 is limited, e.g., to conserve power and/or minimize routing resources required to route data to write queue 250. Similarly, in one embodiment, read queue 250 is configured to read more data from register file 245 in a given cycle than can be provided to various agents in a given cycle. This configuration may reduce power consumption in accessing register file 245 by accessing greater portions of register file 245 at a time rather than using separate accesses.

USC 160, in the illustrated embodiment, includes a plurality of execution pipelines 275 coupled to register file 245. In various embodiments, USC 160 may include any number of execution pipelines 275 and any number of register files 245. In one embodiment, USC 160 includes a plurality of additional register files (not shown) and each register file is configured to store data for multiple execution pipelines. In this embodiment, each register file may be associated with a different write queue and read queue. In the illustrated embodiment, execution pipelines 275 are configured to read operand data from register file 245 and write data back to register file 245 via MUX 270. In one embodiment, MUX 270 is configured to give execution pipelines 275 priority over write queue 250 when there is a conflict when writing to a given bank of register file 245. Similarly, register file 245 may be configured to give priority to execution pipelines 275 over read queue 255 when there is a conflict when reading from a given bank of register file 245. In other embodiments, the final arbiter described below with reference to FIG. 6A may be configured to perform this functionality of selecting between write queue 250, read queue 255, and execution pipelines 275.

Execution pipelines 275 may each include one or more execution units and may be configured to execute graphics operations in parallel. TPU, MCU, iterator 235, and/or dmove unit 240 may be configured to provide data to be processed by execution pipelines 275 and/or read data produced by execution pipelines 275. This data may be passed via register file 245.

Register file 245, in the illustrated embodiment, is configured to store register data for execution pipelines 275. In one embodiment, register file is a random access memory (RAM), but in other embodiments, register file 245 may be implemented using any of various types of storage elements. In one embodiment, register file 245 includes a plurality of banks that may be separately accessed in a given cycle. This may reduce power consumption compared to embodiments with additional ports for a given RAM structure, for example. In one embodiment, each entry in a given bank of register file 245 is configured to store data for multiple execution pipelines 275. Further embodiments of register file entries are described below with reference to FIG. 3A.

MCU 220, in the illustrated embodiment, may be configured to transfer data between a system memory and register file 245. TPU 165 may be configured as described above with reference to FIG. 1B and may be configured to pre-fetch fragment data into register file 245 for operations scheduled by USC 160. Dmove unit 240 may be described as a data mover and may be configured to move data between various elements of graphics unit 150. Iterator 235 may be configured to interpolate pixel attributes based on vertex information.

In various embodiments, a programmable shader such as USC 160 may include any of various elements configured to access a register file, e.g., as illustrated by the input from other write requesting agents 280. The exemplary embodiment of FIG. 2 shows a non-limiting, more detailed exemplary configuration of a graphics unit 150 for illustrative purposes.

Register File

Referring now to FIG. 3A, a block diagram illustrating one exemplary embodiment of a register file bank 245A is shown. In the illustrated embodiment, register file bank 245A includes a plurality of entries, including entry 350. In the illustrated embodiment, each register file entry is configured to store data for eight execution pipelines. In other embodiments, each register file entry may be configured to store data for any of various numbers of execution pipelines such as 4, 16, etc. The notation I#:r# indicates an execution pipeline and register, thus I6:r0 stores data for register 0 of execution pipeline 6. The rx and ry registers are not assigned register numbers in the illustrated embodiment because their register numbers may depend on how many banks are included in register file 245. In various embodiments, register file 245 may include any appropriate number of banks including 1, 2, 4, 8, etc. Further, each bank of register file 245 may include any appropriate number of entries such as 16, 128, 512, etc.

In one embodiment, register file entry 350 is the largest portion of register file bank 245A that is writable in a given cycle. In one embodiment, each register file entry is configured to store either upper more significant bits (hi) or lower less significant bits (lo) of a given register. In this embodiment, execution pipelines 275 may be configured to operate in a low-precision mode using operands the size of only the lower bits of each register. For example, in one embodiment, each register may be 32 bits with 16-bit upper and lower portions. In one embodiment, upper and lower portions of each register may be stored on different banks Thus, in one embodiment, register file entry may store 128 bits (a 16 bit portion of each register times 8 registers). In other embodiments, registers may not be split into upper and lower portions or may be split into additional portions. In some embodiments, it may be efficient in terms of power consumption to write all instance data to be written to a register file entry in a single cycle, as opposed to writing different portions of the instance data in different cycles.

Write Queue

Referring now to FIG. 3B, a block diagram illustrating one embodiment of a write queue 250 is shown. In the illustrated embodiment, write queue 250 is configured to store data to be written to register file 245 in entries 0-N. In the illustrated embodiment, each write queue entry stores data for upper and lower portions of eight registers, which corresponds to two register file entries. In various embodiments, write queue 250 is configured to store data in entries 0-N to be written to register file 245.

In the illustrated embodiment, write queue 250 is configured to store data for a register file in which registers are divided into upper (hi) and lower (lo) portions, and register file entries are configured to store data for eight execution pipelines I7 through I0. In other embodiments, write queue may be configured differently based on different configurations of register file 245, e.g., with entries that store data for different numbers of execution pipelines or registers that are not stored using separate portions. In the illustrated embodiment, a given entry in write queue 250 stores data for two register file entries. In the illustrated embodiment, some agents are configured to write less than an entire write queue entry in a given cycle, e.g., due to bandwidth constraints.

Different agents may request to write to register file 245 in a given cycle, and arbiter 230 may be configured to select one or more such request each cycle to write to write queue 250. In one embodiment, arbiter 230 is configured to accept at most one request each cycle. In some embodiments, write queue 250 consumes power based on its size (e.g., the number of entries N). Thus, it may be advantageous to prioritize writes to write queue 250 based on request characteristics in order to keep data in write queue 250 for relatively short periods, which may allow implementation of a smaller write queue.

Referring now to FIG. 3C, a diagram illustrating exemplary accesses by TPU 165 is shown. In the illustrated embodiment, TPU 165 is configured to provide hi and lo portions of registers for four execution pipelines each cycle. Thus, in this embodiment, TPU 165 is configured to write data for half of two register file entries in a given cycle. In some situations, this may be all the data that TPU 165 writes for those register file entries. For example TPU access 310 may occur without TPU access 320. In other situations, TPU 165 may provide data for two complete register file entries in different cycles (e.g., using TPU access 310 in a first cycle and TPU access 320 in a second cycle). Thus, in some embodiments, write queue 250 may be configured to wait for a second write to an entry before writing to register file 245 in order to write all data for a given register file entry during the same cycle.

Referring now to FIG. 3D, a diagram illustrating exemplary accesses by dmove unit 240 is shown. In the illustrated embodiment, dmove unit 240 is configured to provide data for a complete register file entry in a given cycle, which is data for eight execution pipelines in the illustrated embodiment. This is shown by dmove accesses 330 and 340, which may occur in different cycles. Note that in one embodiment, dmove unit 240 may be configured to perform different access types in different modes.

In various embodiments, arbiter 230 may be configured to consider one or more request criteria when selecting a request to write queue 250, including, for example (1) whether a request is a last request from an agent for a given entry in register file 245 and/or (2) whether a request finishes a previous request for a given entry.

As an example of criterion (1) above, TPU access 310 is a last access by TPU 165 for a given register file entry if TPU 165 will not perform TPU access 320 as part of the same transaction. In contrast, TPU access 310 is not a last access by TPU 310 for a given register file entry if TPU 165 will later perform TPU access 320 as part of the same transaction (in which case TPU access 320 would be a last access by TPU 165 for two given register file entries). Similarly, dmove access 330 is a last request to a given register file entry because it writes data for a complete register file entry.

As used herein, the term "last" in the context of an access of a register file entry does not refer to a last request "ever" in an absolute sense. Rather, this term refers to a last known request for a given request, a last request within some time-frame, etc. For example, a "determined last" request is a request that a requestor has determined is a last request for data for a current transaction. As another example, a last request may be the last request within a given time frame, or within a buffer of known future transactions. A last request typically includes data that should be written, without waiting for more data, to avoid power inefficiency. Thus, TPU 165 may be configured to determine whether it will generate a second request to the same register file entry as part of a same transaction or shortly after a first request to the entry. If it does not determine that it will generate a second request within a given time frame or as part of the same transaction, TPU 165 may be configured to indicate that the first request is "last" request.

As an example of criterion (2) above, if TPU access 320 follows TPU access 310, it finishes a previous request, because it completes the data to be written to a given register file entry. In contrast, dmove accesses 330 and 340 do not finish previous requests because they each provide all data to be written to a given register file entry and thus there is no previous request to be finished.

Various agents may be configured to indicate to arbiter 230 whether or not a given request is a last request and whether or not a given request finishes a previous request. For example, in one embodiment, this information is included or encoded in each request.

Referring now to FIG. 4A, exemplary write request classifications 402 and tables 410-430 illustrating an exemplary priority scheme are shown. In the illustrated embodiment, write request classifications 402 are based on the two request criteria discussed above with reference to FIG. 3. In the illustrated embodiment, write classifications 402 include three request types: (1) non-last, (2) finishing, and (3) last non-finishing.

A "non-last request" is a request to write to a given register file entry, that is not a last request by an agent for the given entry. Thus, in the example of FIG. 3C, TPU access 310 is a non-last request when TPU 165 plans to subsequently perform TPU access 320 for the same register file entry.

A "finishing request" is a request that finishes (or provides additional data for) a previous request and is the last request for a given register file entry. Thus, in the example of FIG. 3C, TPU access 320 is a finishing request if it follows TPU access 310. In embodiments where an agent is configured to access even smaller portions of a register file entry, a finishing request may be a third or fourth request to a given entry, for example.

A "last non-finishing request" is a request that does not finish a previous request, but is a last request by an agent for a given register file entry. A lone request by TPU 165 that does not include all data for a register file entry is one example of a last non-finishing request. A request for a dmove access as shown in FIG. 3D is another example of a last non-finishing request because it does not finish a previous request, and is a last request (it includes all data to be written to a given register file entry).

In some embodiments, additional request criteria and/or request classifications may be implemented in addition to and/or in place of those discussed herein.

Tables 410-430 illustrate one embodiment of a priority scheme that uses request classifications 402. In the illustrated embodiment, arbiter 230 is configured to maintain a priority state 412 that indicates a write requestor (or agent) that currently has highest priority. The notations P1 through P9 indicate relative priority among types of requests from different agents R0-R2 (which may correspond to MCU 220, TPU 165, dmove unit 240, and/or iterator 235, for example). In the illustrated embodiment P1 indicates a highest-priority request type and P9 indicates a lowest priority request type.

In one embodiment, arbiter 230 is configured to accept one write request per cycle based on relative priority (e.g., arbiter 230 is configured to accept an outstanding write request with the highest relative priority). In one embodiment, arbiter 230 is configured to update priority state 412 each time it accepts a last non-finishing request or a non-last request.

Table 410 illustrates a situation in which priority state 412 indicates agent R0. In the illustrated embodiment, arbiter 230 is configured to give finishing requests from R0 highest priority (P1), followed by finishing requests from R1 and R2 (priority P2 and P3 respectively). In the illustrated embodiment, arbiter 230 is then configured to allow last non-finishing requests from R0 (at P4) followed by non-last requests from R0 (P5). In the illustrated embodiment, arbiter 230 is then configured to allow last non-finishing and non-last requests from R1 and R2 (at P6-P9). Thus, in the illustrated embodiment, finishing requests will block other requests until there are no outstanding finishing requests. Table 420 illustrates a situation in which priority state 412 indicates agent R1, while table 430 illustrates a situation in which priority state 412 indicates agent R2.

In the illustrated embodiment, the relative priority among agents for finishing requests is fixed and is not dependent on priority state 412 (e.g., finishing requests from R0 are always higher priority than finishing requests from agent R2). This may reduce power consumption in arbiter logic, in one embodiment. This scheme also may ensure some fairness among agents. For example, in this embodiment, finishing requests by R2 are guaranteed to be serviced eventually because last non-finishing and non-last requests from R0 and R1 will not be accepted until all finishing requests are accepted. Thus, R0 and R1 will eventually run out of finishing requests (because finishing requests must follow one or more non-last requests) and any finishing requests from R2 will be accepted. Further, cycling priority state 412 among various agents may provide fairness among last non-finishing and non-last requests by the agents, in some embodiments. In the illustrated embodiment, three agents or write requestors are shown, but similar techniques are contemplated for any of various numbers of agents. In one embodiment, each agent is configured to send at most one request of each type per cycle.

Once arbiter 230 has accepted a request, write queue 250 may be configured to determine which entry to use to store data for the request. In one embodiment, when a finishing request is accepted, write queue 250 is configured to determine if any queue entries is storing data for a matching non-last request and store the finishing request in an entry with a matching non-last request if present. Otherwise, for a finishing request that does not match any stored non-last requests (e.g., because a matching non-last request has already been written to register file 245), write queue 250 may be configured to store the finishing request in a first available queue entry. Similarly, write queue 250 may be configured to store non-last and last non-finishing requests in first available queue entries. In some embodiments, write queue 250 may include or be coupled to a write queue controller (not shown) configured to perform various functionality described herein with reference to write queue 250.

Write queue 250, in various embodiments, is also configured to send requests to write to register file 245. In one embodiment, graphics unit 150 includes a final arbiter configured to handle such requests. One embodiment of a final arbiter is described below with reference to FIG. 6A.

In one embodiment, for each bank of register file 245, write queue 250 is configured to pick one entry to potentially write to that bank (if an entry storing data for that bank is present) and send a write request to the register file for that entry. Thus, write queue 250 may send requests to access multiple banks to the register file or to a final arbiter. In one embodiment, write queue 250 is configured to maintain a priority pointer for each bank of register file 245 that points to an entry of write queue 250. In this embodiment, write queue 250 is configured to update the priority pointer for a given bank each time a write from write queue 250 to that bank is accepted, in order to cycle through the entries of write queue 250 and prevent one entry from blocking other entries' access to a given register file bank.

In one embodiment, write queue 250 is configured to wait to send write requests for entries storing data for non-last transactions until a matching finishing transaction is received. This may avoid writing to a register entry twice, which typically uses more power than writing to an entry once. However, this implementation could cause a hang scenario if write queue 250 were to fill with non-last transactions. Therefore, in one embodiment, write queue 250 is configured to begin sending write requests for entries storing data for non-last transactions when write queue 250 is currently storing more than a particular threshold amount of data.

The arbitration scheme of FIG. 4A may generally reduce the amount of time that non-last transactions are stored in write queue 250 before their corresponding finishing transactions arrive. This may allow implementation of a smaller write queue 250 (e.g., including a smaller number of entries) which may reduce power consumption. Further, grouping data to write a complete register file entry in one cycle may reduce power consumption in accessing the register file. This scheme may also maintain fairness among requesting agents.

Figure 4B:
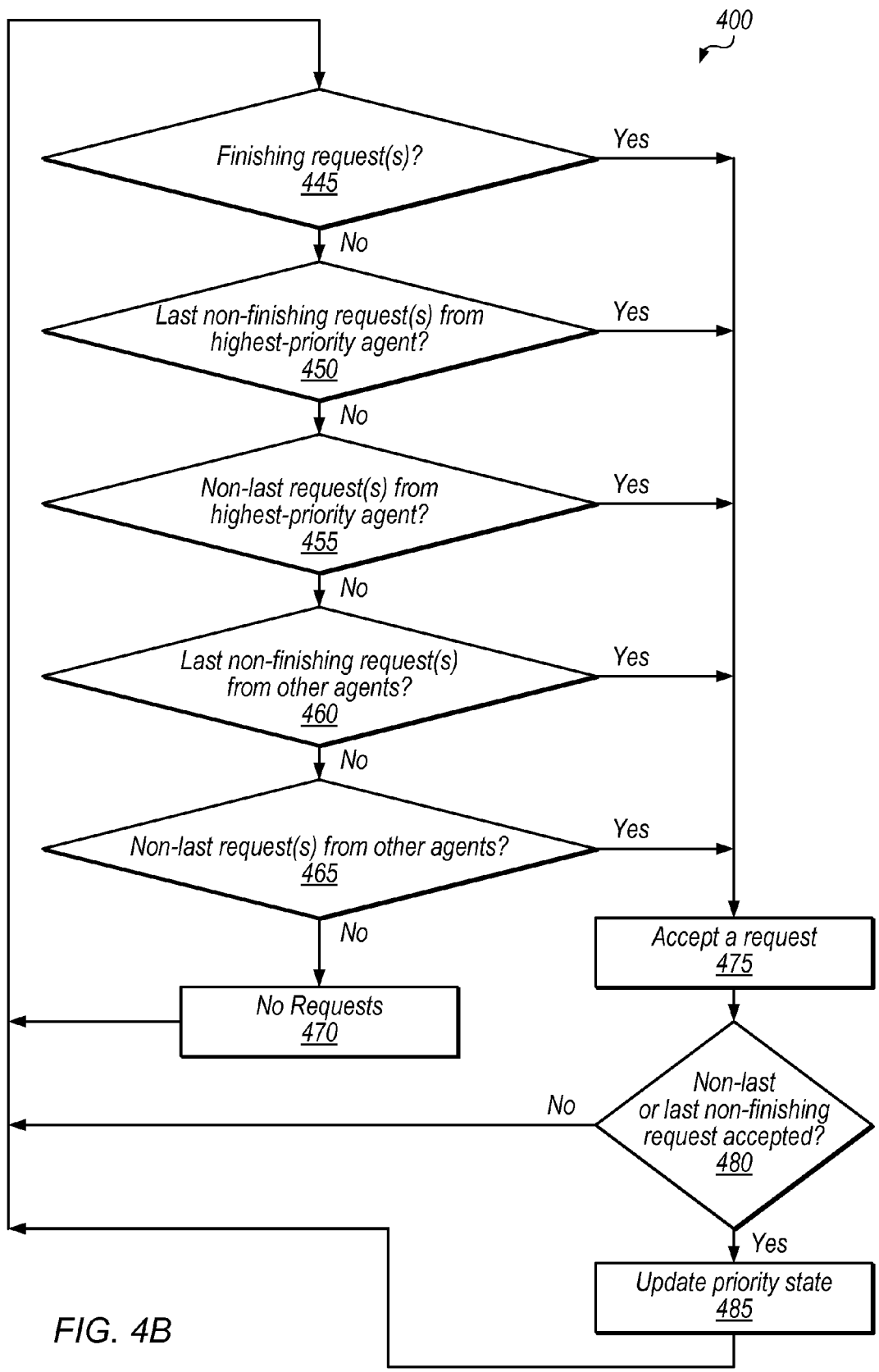
FIG. 4B is a flow diagram illustrating one exemplary embodiment of a method for selecting a write request.

Referring now to FIG. 4B, a flow diagram illustrating one embodiment of a method 400 for selecting a write queue request is shown. In one embodiment, arbiter 230 is configured to perform the illustrated steps each cycle in order to accept a request each cycle if there are any outstanding requests. In various embodiments, arbiter 230 may be configured to perform some of the method elements concurrently and/or omit some method elements. In still other embodiments, arbiter 230 may be configured to perform one or more of the method elements in a different order. Additional method elements may also be performed as desired. In one embodiment, the method of FIG. 4B corresponds to the priority scheme of FIG. 4A. Flow begins at decision block 445.

At decision block 445, arbiter 230 is configured to determine whether there are outstanding finishing request(s). If the result is "yes," flow proceeds to block 475 in which arbiter 230 is configured to accept a finishing request. In one embodiment, arbiter 230 is configured to accept a finishing request based on a fixed priority scheme (e.g., without considering priority state 412, which is not fixed). For example, in the embodiment of FIG. 4A, arbiter 230 is configured to select a finishing request from R0 if present. As shown in FIG. 4A, in this embodiment, if no finishing request from R0 is outstanding, arbiter 230 is configured to select a finishing request from R1, then R2. If the result of decision block 445 is "no," flow proceeds to decision block 450.

At decision block 450, arbiter 230 is configured to determine whether there are last non-finishing request(s) from the highest-priority agent (e.g., as indicated by priority state 412). Note that in one embodiment, a given agent is configured to send at most one request to arbiter 230 in a given cycle. In other embodiments, agents may be configured to send multiple requests to arbiter 230 in a given cycle. If the result of decision block 450 is "yes," flow proceeds to block 475 in which arbiter 230 is configured to accept the last non-finishing request from the highest-priority agent. Otherwise, flow proceeds to decision block 445.

At decision block 455, arbiter 230 is configured to determine whether there are non-last request(s) from the highest-priority agent, If the result is "yes," flow proceeds to block 475 in which arbiter 230 is configured to accept the non-last request from the highest-priority agent. Otherwise, flow proceeds to decision block 460.

At decision block 460, arbiter 230 is configured to determine whether there are outstanding last non-finishing request(s) from agents other than the highest-priority agent. If the result is "yes," flow proceeds to block 475 in which arbiter 230 is configured to accept a last non-finishing request from one of the other agents. In one embodiment, arbiter 230 is configured to select among multiple such requests based on proximity to priority state 412 in an ordering of agents, e.g., as shown by the 'P' values in FIG. 4A. If the result of decision block 460 is "no," flow proceeds to decision block 465.

At decision block 465, arbiter 230 is configured to determine whether there are outstanding non-last request(s) from other agents. If the result is "yes," flow proceeds to block 475 in which arbiter 230 is configured to accept a non-last request from one of the other agents. In one embodiment, arbiter 230 is configured to select among multiple such requests based on proximity to priority state 412 in an ordering of agents, e.g., as shown in FIG. 4A. If the result of decision block 460 is "no," flow proceeds to block 470.

Block 470, in one embodiment, indicates that there are no outstanding requests to write queue 250 in a given cycle. In this case, the data stored in write queue 250 may remain unchanged. Flow proceeds back to block 445, which may be performed in a subsequent cycle.

At block 475, as discussed above, arbiter 230 is configured to accept a request determined in one of blocks 445-465. Flow proceeds to decision block 480.

At decision block 480, it is determined whether a non-last or last non-finishing request was accepted in block 475. If the result is "yes," flow proceeds to block 485. Otherwise, flow proceeds to decision block 445, which may be performed again in a subsequent cycle.

At block 485, arbiter 230 is configured to update priority state 412 to indicate a new highest-priority agent. In one embodiment, arbiter 230 is configured to increment priority state 412 to indicate a next agent in an ordering of agents. For example, in the embodiment of FIG. 4A, arbiter 230 is configured to cycle priority state 412 through the agents according to the ordering R0, R1, R2, R0, R1, R2, etc. In one embodiment, arbiter 230 is configured to notify a requesting agent when a request is accepted. Flow proceeds back to decision block 445, which may be performed again in a subsequent cycle.

In one embodiment, arbiter 230 is configured to perform steps 445-465 in parallel, e.g., using combinatorial logic with information associated with outstanding requests as inputs. In one embodiment, arbiter 230 is configured to perform method 400 each cycle during operation of USC 160.

Read Queue

In one embodiment, read queue 255 includes entries similar to the entries of write queue 250 shown in FIG. 3B. Thus, each read queue entry may be configured to store data for multiple register file entries and/or multiple execution pipelines.

Referring now to FIG. 5A, a block diagram illustrating one embodiment of an arbitration technique for read queue 255 is shown. In the illustrated embodiment, priority state 502 indicates a current highest-priority read requestor (or agent). In the illustrated embodiment, relative priority is based on proximity to the current highest-priority agent in the list. For example, in the illustrated embodiment, priority state 502 indicates agent R2 at priority P1, which is followed by R3, R0, then R1 in terms of relative priority. In one embodiment, arbiter 260 is configured to accept one read request each cycle and read queue 255 is configured to read data from register file 245 for accepted requests. In one embodiment, arbiter 260 is configured to update priority state 502 each time it accepts a read request. In one embodiment, dmove unit 240 is the only read requestor, and USC 160 may not include arbiter 260.

Read queue 255, in one embodiment, is configured to assign an accepted read request to a next available entry in read queue 255. Subsequently, read queue 255 may be configured to read data for the request from register file 245 and store the data in the entry. Read queue 255 may be configured to read more data from register file 245 in a given cycle than it can provide to an agent in a given cycle (e.g., due to bandwidth restrictions, which may reduce power consumption). Thus, in some embodiments, read queue 255 is configured to provide data from read queue entries to an agent over multiple cycles. In another embodiment, register file 245 is configured to stream data directly to requestors without storing data in a read queue.

Referring now to FIGS. 5B-5E, different read access types by agents are shown. In the illustrated embodiment, access type 510 corresponds to only a portion of a register file entry. In the illustrated embodiment (which corresponds to a register file configured according to the embodiment of FIG. 3A), access type 520 corresponds to portions of two register file entries. In the illustrated embodiment, access type 530 corresponds to two complete register file entries (which requires two cycles to provide to a requesting agent in the illustrated embodiment) while access type 540 corresponds to one complete register file entry. In one embodiment, for two-cycle access requests, read queue 255 is configured to provide the data in a fixed order over consecutive cycles. In another embodiment, register file 245 is configured to send data directly to requesting agents and may be configured to send the data over multiple cycles or in a single cycle. In the illustrated embodiment of FIG. 5A, arbiter 260 is configured to accept requests without considering request types. In other embodiments, arbiter 260 may be configured to accept requests based on access types as well as priority state 502.

In one embodiment, USC 160 is configured to provide five different read access modes to register file 245. In this embodiment, the first two modes are four-instance reads of access type 520: the first mode is for a read for pipelines i7:i4 and the second for a read for pipelines i3:i0. In this embodiment, a third mode corresponds to access type 540 and is a read of either hi or lo data for eight execution pipelines. In this embodiment, fourth and fifth modes correspond to access type 530, and return data for eight instances both high and low (e.g., data corresponding to access type 530). In the fourth mode, the data is grouped into hi and lo when returned (e.g., in two groups, each similar to access type 540), while in the fifth mode, the data is grouped into groups of four instances when returned (e.g., in two groups, each similar to access type 520). For the fourth and fifth modes, data may be provided over two consecutive clock cycles. Providing these read access modes in this embodiment may allow power gating of selection circuitry when accessing register file 245, e.g., based on which groups of data are being read. These read access modes may also provide data to agents in an efficient format for each agent, and may allow an agent to request a particular mode to receive data in a desired format. These read access modes may be used in embodiments with read queue 255 and embodiments that do not include a read queue. In one embodiment, USC 160 is configured to stream data from register file 245 to requesting agents without aggregating data in a read queue.

In one embodiment, read queue 255 may be configured to determine, for each bank of register file 245, whether requests accepted to read queue 255 specify a read from the bank. The read queue 255 may include multiple entries associated with requests to the same register file bank. In one embodiment, read queue 255 is configured to maintain a priority pointer for each bank of register file 245 that points to an entry of read queue 255. In this embodiment, read queue 255 is configured to update the priority pointer for a given bank each time a request from read queue 255 to that bank is accepted, in order to cycle through the entries of write queue 250 and prevent blocking when multiple entries target the same bank. Read queue 255 may include or be coupled to a read queue controller (not shown) configured to perform various functionality described herein with reference to read queue 255.

Final Arbitration

Referring now to FIG. 6A, a block diagram illustrating one embodiment of a graphics unit 150 that includes a final arbiter 610 is shown. In the illustrated embodiment, final arbiter 610 is configured to select from requests by write queue 250, read queue 255 and high priority requests 615 to access each of register file banks 245A-N. In one embodiment, high priority requests 615 correspond to requests from execution pipelines 275. In one embodiment, final arbiter 610 is configured to give priority to high priority requests 615 in a given cycle while limiting requests from write queue 250 and read queue 255. In some embodiments, final arbiter 610 is configured to restrict write queue 250 and/or read queue 255 to accessing a given maximum number of register file banks in a given cycle.

As described above, write queue 250 and read queue 255 may submit multiple requests to final arbiter 610 in a given cycle. In one embodiment, write queue 250 and read queue 255 are configured to submit at most one request per bank in each cycle. In one embodiment, final arbiter 610 is configured to accept requests from write queue 250 for at most two banks (a bank storing hi register data and a bank storing lo register data) in a given cycle and accept request from read queue 255 for at most two banks (a bank storing hi register data and a bank storing lo register data) in a given cycle. The lo register data and hi register data may or may not correspond to the same register.

In one embodiment, final arbiter 610 is configured to notify write queue 250 or read queue 255 when a request has been accepted. Write queue 250 and/or read queue 255 are configured to update a priority pointer for a given bank based on this notification, in one embodiment.

In one embodiment, graphics unit 150 is configured to read or write at most one entry from each register file bank in a given cycle. In this embodiment, final arbiter 610 is configured to first assign outstanding high priority requests 615 to register file banks. In this embodiment, final arbiter 610 is configured to assign accesses by write queue 250 and/or read queue 255 to register file banks that are not requested by any high priority requests 615 in a given cycle. As discussed above, each register file bank 245 may store an upper or lower portion of registers in some embodiments.

Referring now to FIG. 6B, a table showing one embodiment of an exemplary arbitration scheme for final arbiter 610 is shown. In the illustrated example, the datapath (configured to initiate high priority requests 615) always has highest priority P1, followed by a request type indicated by priority state 602. In the illustrated embodiment, priority state 602 cycles through entries of the table (other than the datapath, which is always P1).

In one, priority state 602 indicates a group of register file banks that store data portions that make up one or more registers. For example, in one embodiment, group 0 includes two banks that store hi and lo portions of registers for multiple execution instances. The number of register file banks 245M, in one embodiment, is equal to the number of register file banks per group times the number of groups.

In one embodiment, final arbiter 610 is configured to accept at most a hi and a lo request from write queue 250 and a hi and a lo request from read queue 255 based on priority state 602. For example, in the illustrated embodiment, RQ group 0 has highest priority after the datapath. If the datapath accesses hi and lo banks of group 0, then read queue 255 cannot access group 0. If the datapath does not access one or more of the hi and lo banks of group 0, final arbiter 610 may accept a request from read queue 255 to group 0 (which may access either the hi or lo portion of the group, or both if the datapath does not access the group at all). Similarly, in the illustrated situation, if there is no outstanding request from the datapath or read queue 255 to group zero, final arbiter 610 may accept a request from write queue 250 to group 1, and so on. This may improve bandwidth by ensuring that, if there accesses to be performed that can be performed, at least some of them will be performed. For example, in the illustrated situation WQ group 0 has lowest priority. However, if other groups do not desire to access banks that are not also accessed by the datapath, final arbiter 610 may allow a WQ group 0 access.

Speaking generally, in this embodiment, if the datapath accesses all banks in all N groups in a given cycle, final arbiter does not allow write queue 250 and read queue 255 to access register file 245. However, if the datapath does not access all banks in all N groups, final arbiter 610 is configured to accept up to two requests, one hi and one lo, from write queue 250 and two requests, one hi and one lo, from read queue 255 to different register file banks.

In one embodiment, final arbiter 610 is configured to increment priority state 602 when the datapath does not access any register file banks in a group indicated by priority state 602 in a given cycle. Final arbiter 610 may be configured to increment priority state 602 whether or not the write queue 250 or the read queue 255 actually access any banks indicated by priority state 602 in that cycle. This technique may guarantee that every requestor will eventually get access to the register file and prevent livelock situations.

As used herein, a register file "group" refers to a set of multiple register file banks. Thus, different banks in a group may be separately accessible in a given cycle. In some embodiments, banks storing different portions of the same registers make up a register group. For example, a bank storing lo data for one or more registers and a bank storing hi data for the same one or more registers may be described as a register file group. In various embodiments, register file groups may include any number of register file banks. In one embodiment, each entry in write queue 250 is configured to store data for a register file group. For example, each write queue entry may store hi and lo portions of registers, which may be associated with register file banks storing hi and lo portions of registers.

In one embodiment (not shown), priority state 602 indicates a single bank of register file 245 rather than a group of banks. This embodiment may correspond to embodiments of a register file that do not store separate high and low portions of registers, for example.

Exemplary Method and Device

Figure 7:
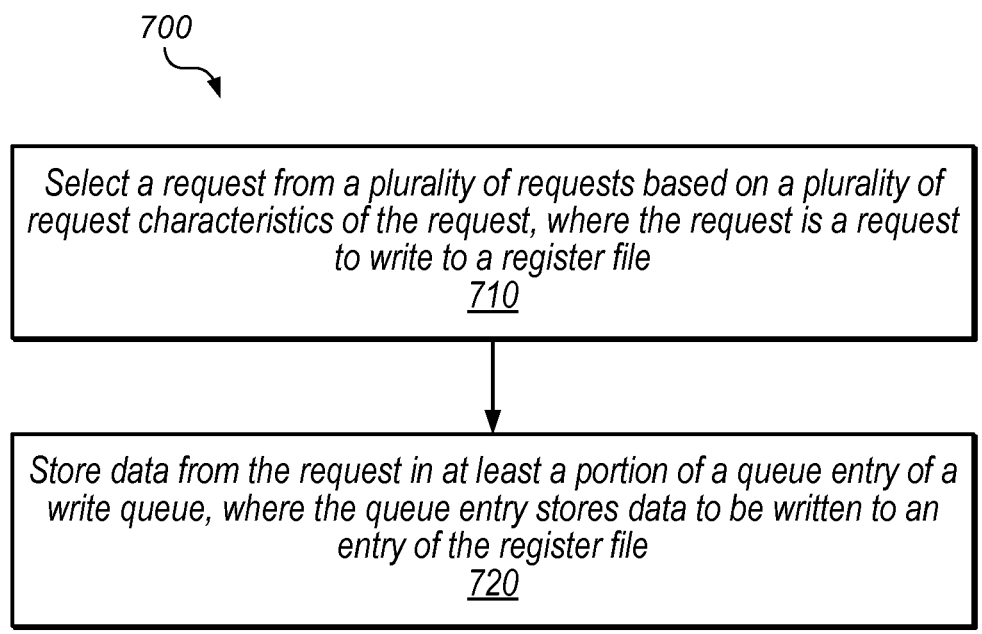
FIG. 7 is a flow diagram illustrating one embodiment of a method for selecting a write request.
Figure 8:
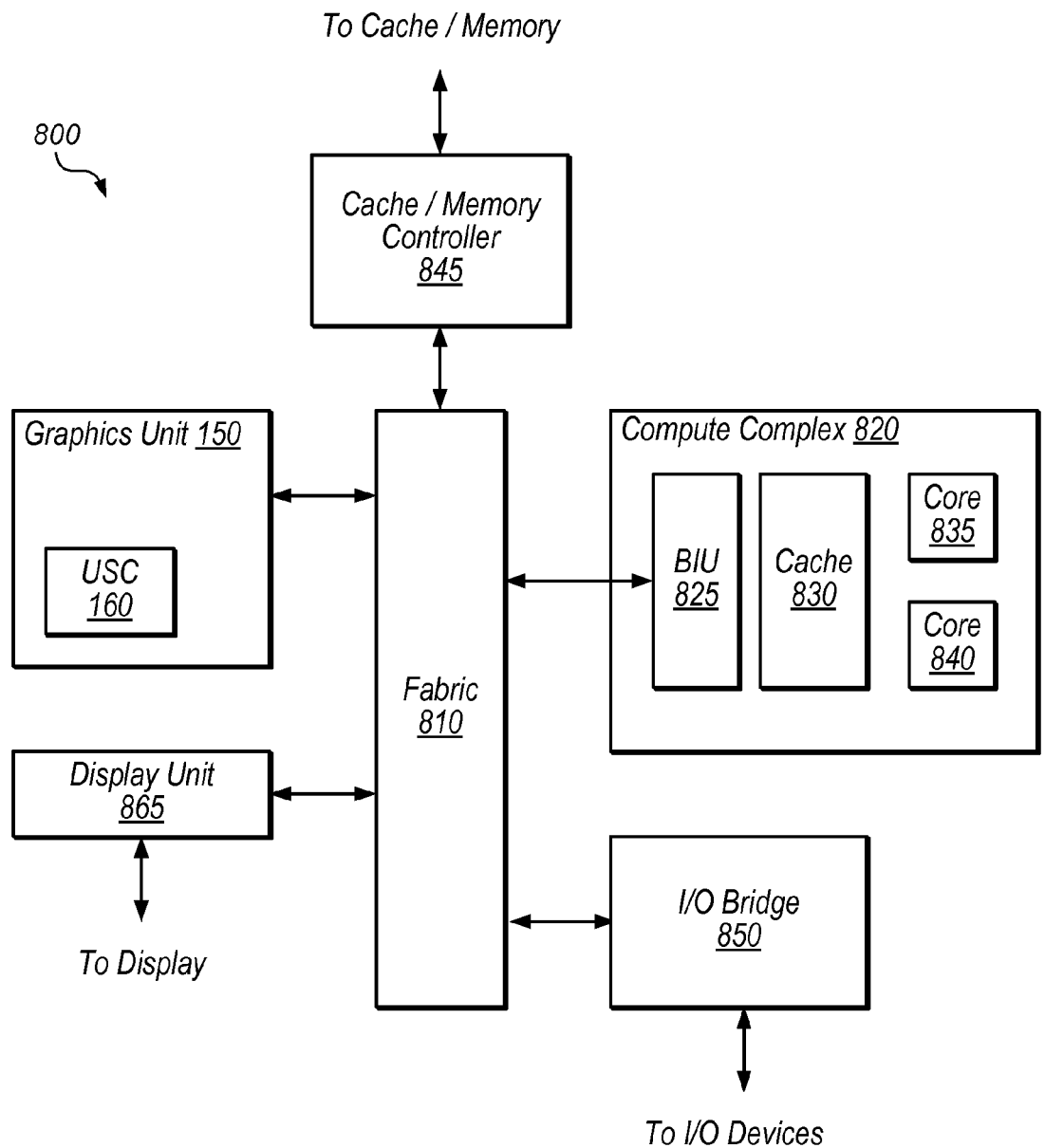
FIG. 8 is a block diagram illustrating one embodiment of a device that includes a graphics unit.

Referring now to FIG. 7, a flow diagram illustrating one exemplary embodiment of a method 700 for selecting a request to access a write queue is shown. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, an arbitration unit selects a request from a plurality of requests based on a plurality of request characteristics of the request. In this embodiment, the request is a request to write to a register file. In one embodiment, the request characteristics include whether the request is a last request from an agent for a given register file entry and whether the request finishes a previous request. In one embodiment, based on these characteristics, a request may be characterized as finishing, last non-finishing, or non-last. Flow proceeds to block 720.

At block 720, data from the request is stored in a least a portion of a queue entry of a write queue. In this embodiment, the queue entry stores data to be written to one or more entries of the register file. Flow ends at block 720.

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 150, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may be configured as described above with reference to FIGS. 1B through 6. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a register file comprising a plurality of entries, wherein entries in the register file include multiple portions and wherein the apparatus is configured to separately write to ones of the multiple portions of the entries; and
    a write queue coupled to the register file and configured to store data to be written to the register file;
    wherein the apparatus is configured to:
        receive a plurality of requests to write to the register file from a plurality of requesting processing elements;
        select a request from the plurality of requests based on one or more request characteristics, wherein the one or more request characteristics include whether the request finishes a multiple-request transaction that includes requests to write to different portions of one of the entries in the register file; and
        store data from the selected request in the write queue.

2. The apparatus of claim 1, wherein the one or more request characteristics further include:
    whether the request is a last request from an agent for a given entry of the plurality of entries.

3. The apparatus of claim 1, wherein each of the plurality of entries is configured to store data for a plurality of graphics execution pipelines.

4. The apparatus of claim 1,
    wherein the apparatus is configured to give highest priority to finishing requests that are requests that finish transactions associated with a previous request and that are last requests from a requesting processing element for a given entry;
    wherein the apparatus is configured to give intermediate priority to last non-finishing requests that are last requests from a requesting processing element for a given entry but do not finish a transaction associated with a previous write request; and
    wherein the apparatus is configured to give lowest priority to non-last requests that are not last requests from a requesting processing element for a given entry.

5. The apparatus of claim 1,
wherein the apparatus is configured to:
maintain an indication of a current highest-priority processing element;
in a given cycle, select the request from the plurality of requests in the following priority order:
finishing requests;
last non-finishing requests from the highest-priority processing element;
non-last requests from the highest-priority processing element;
last non-finishing requests from other processing element; and
non-last requests from other processing element; and
change the indication of the highest-priority processing element to another processing element after selecting a non-last request or a last non-finishing request.

6. The apparatus of claim 5, wherein the apparatus is configured to select from among multiple finishing requests according to a fixed priority scheme that is not based on the indication of the current highest-priority processing element.

7. The apparatus of claim 5, wherein the priority of requests from other processing elements is based on their proximity to the highest-priority processing element in an ordering of processing elements.

8. The apparatus of claim 1, further comprising:
one or more execution pipelines; and
an arbitration unit, configured to select a requestor to access a given bank of the register file from at least the write queue and one or more execution pipelines.

9. The apparatus of claim 8,
wherein the write queue is configured to select at most one request for each bank of the register file to send to the arbitration unit in a given cycle.

10. The apparatus of claim 8, further comprising:
a read queue;
wherein the arbitration unit is configured to give highest priority to the one or more execution pipelines; and
wherein the arbitration unit is configured to determine priority between the write queue and the read queue based on an indication of a current highest-priority group of register file banks.

11. The apparatus of claim 10, wherein the arbitration unit is configured to update the indication of the current highest-priority group in response determining that the one or more execution pipelines did not access any banks included in the current highest-priority group of register file banks in a given cycle.

12. The apparatus of claim 1, wherein the plurality of requests are from different requesting processing elements that include two or more of: a memory controller, a data mover, an iterator, and a sample return unit.

13. A method, comprising:
selecting, by an arbitration unit, a request from a plurality of requests to write to a register file, wherein the requests are received from a plurality of different requesting agents, wherein the selecting is based on a plurality of request characteristics of the request, wherein entries in the register file include multiple portions that are separately writeable, and wherein the plurality of request characteristics include:
whether a given request is a last request from an agent for an entry of the register file; and
whether the request finishes a multiple-request transaction that includes requests to write to different portions of one of the entries in the register file; and
storing data from the request in at least a portion of a queue entry of a write queue, wherein the queue entry stores data to be written to an entry of the register file.

14. The method of claim 13, the method further comprising:
identifying each of the plurality of requests as one of:
a finishing request that is a last request from an agent for a given entry of the register file and that finishes a transaction associated with a previous write request;
a last non-finishing request that is a last request from an agent for a given entry of the register file but does not finish a transaction associated with a previous write request; and
a non-last request that is not a last request from an agent for a given entry of the register file.

15. The method of claim 13, the method further comprising:
maintaining an indication of a current highest-priority agent; and
changing the indication of the highest-priority agent to indicate another agent after selecting the request;
wherein selecting the request includes selecting a request in the following priority order:
finishing requests;
last non-finishing requests from the highest-priority agent;
non-last requests from the highest-priority agent;
last non-finishing requests from other agents; and
non-last requests from other agents.

16. The method of claim 15, further comprising:
selecting the request from a given type of request by other agents based on the other agent's proximity to the highest-priority agent in an ordering of agents.

17. The method of claim 13, further comprising:
selecting, by an arbitration unit, a requestor to access a given bank of the register file from a plurality of requestors, including: the write queue, a read queue having a plurality of entries, and one or more execution pipelines.

18. The method of claim 17, further comprising:
selecting, from each of the read queue and the write queue, at most one request for each bank of the register file each cycle to be sent to the arbitration unit.

19. The method of claim 17, further comprising:
giving a highest priority to the one or more execution pipelines; and
determining priority between the write queue and the read queue based on an indication of a current highest-priority one or more banks of the register file and one of the write queue and the read queue.

20. The method of claim 19, further comprising:
updating the indication of the current highest-priority one or more banks in response determining that the one or more execution pipelines did not access the one or more banks during a given cycle.

21. An apparatus, comprising:
a register file comprising a plurality of entries, wherein entries in the register file include multiple portions and wherein the apparatus is configured to separately write to ones of the multiple portions of the entries; and
a write queue coupled to the register file and configured to store data to be written to the register file;
wherein the apparatus is configured to:
receive a plurality of requests to write to the register file from a plurality of requesting processing elements;
select a request from a plurality of requests based on one or more request characteristics, wherein each of the plurality of requests is a request to write to the register file, and wherein the one or more request characteristics include whether the request is a last request for a given entry of the plurality of entries from a requesting processing element; and store data from the selected request in the write queue.

22. The apparatus of claim 21, wherein the apparatus is configured to give highest priority to finishing requests that are requests that finish transactions associated with a previous request and that are last requests from requesting processing element for a given entry;

wherein the apparatus is configured to give intermediate priority to last non-finishing requests that are last requests from requesting processing element for a given entry but do not finish a transaction associated with a previous write request; and wherein the apparatus is configured to give lowest priority to non-last requests that are not last requests from requesting processing element for a given entry.

* * * * *